(No Model.) 2 Sheets—Sheet 2.
J. D. MATTISON.
ROLLER BEARING.
No. 522,796. Patented July 10, 1894.
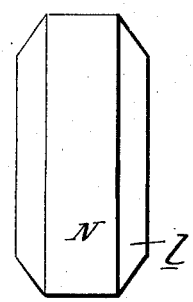
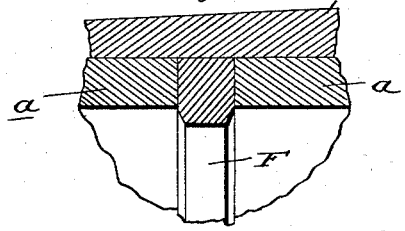
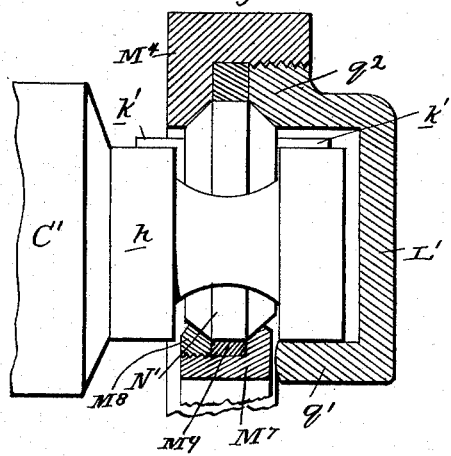
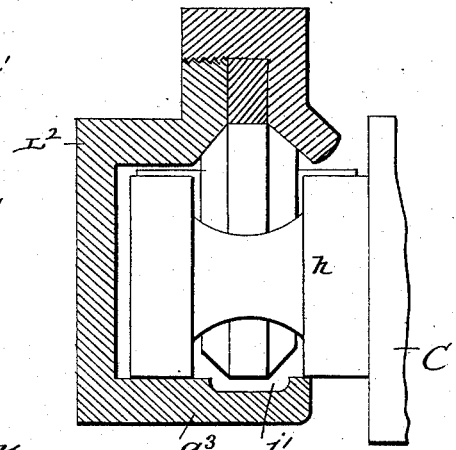
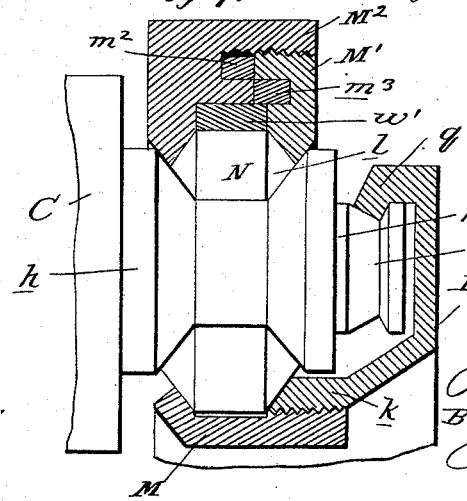
Witnesses:
Inventor
James D. Mattison
By James J. Sheehy
Attorney

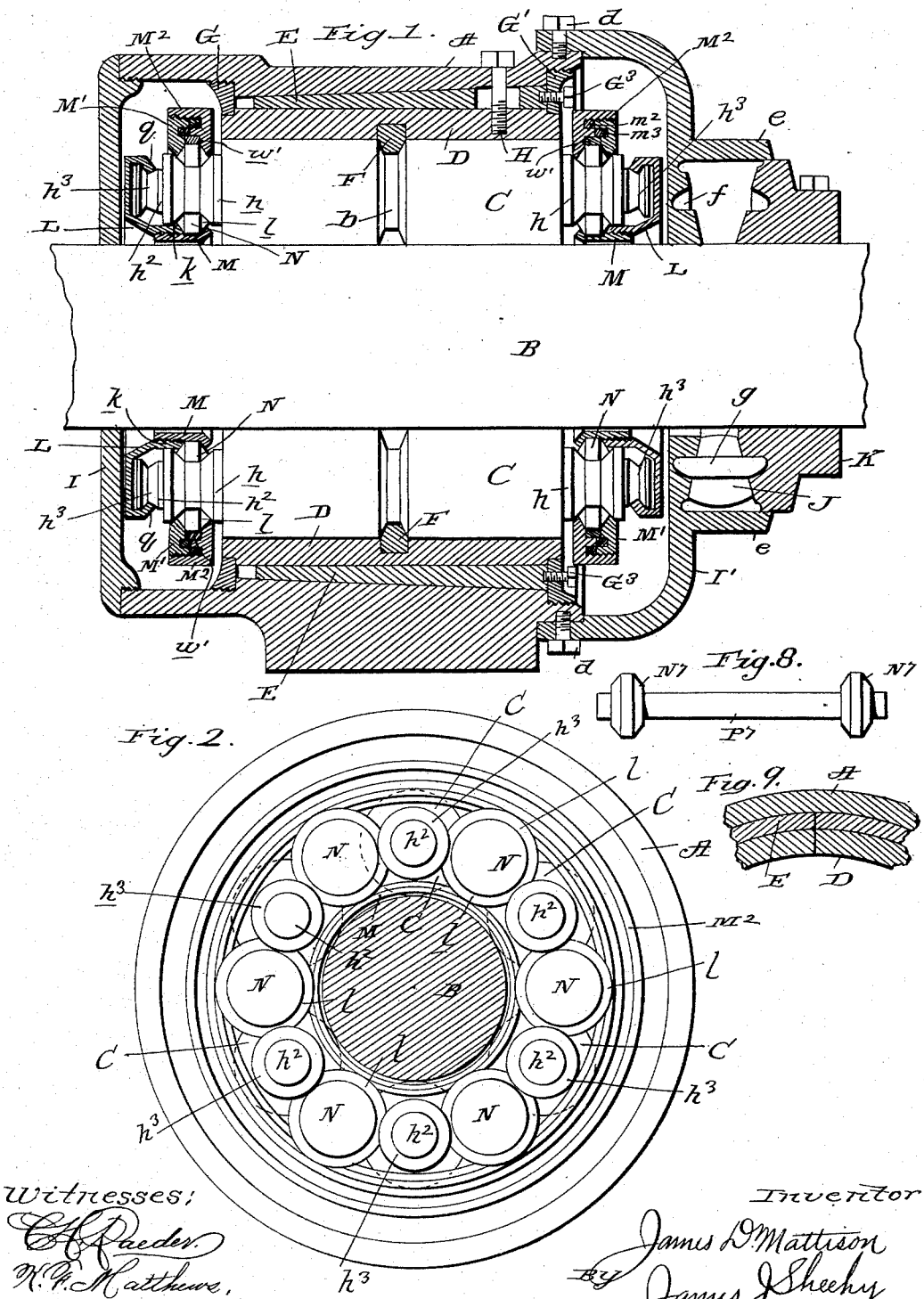

UNITED STATES PATENT OFFICE.

JAMES D. MATTISON, OF SAGINAW, MICHIGAN.

ROLLER-BEARING.

SPECIFICATION forming part of Letters Patent No. 522,796, dated July 10, 1894.

Application filed September 16, 1893. Serial No. 485,678. (No model.)

*To all whom it may concern:*

Be it known that I, JAMES D. MATTISON, a citizen of the United States, residing at Saginaw, in the county of Saginaw and State of Michigan, have invented certain new and useful Improvements in Roller-Bearings; and I do declare the following to be a full, clear, and exact description of the invention, such as will enable others skilled in the art to which it appertains to make and use the same.

My invention relates to improvements in that class of anti-friction roller bearings in which a series of bearing rollers and a series of intermediate or separating rollers are employed in conjunction with a shaft or journal, and it has for its general object to provide a bearing of the character stated embodying such a construction and arrangement of parts that sliding friction and consequent wear of the parts will be absolutely prevented.

A specific object of the invention is to provide means whereby the intermediate or separating rollers may be readily adjusted and adjustably fixed so as to hold them and the bearing rollers in their proper positions; and a further specific object is to provide means whereby the bearing rollers may be adjusted with respect to the shaft or journal, independent of the adjustment of the intermediate or separating rollers.

Other objects and advantages of the invention will be understood from the following description and claims when taken in connection with the accompanying drawings, in which—

Figure 1, is a vertical, diametrical section of my improved bearing. Fig. 2, is an elevation of the inner end of the bearing with parts removed. Fig. 3, is an elevation of one of the intermediate rollers, removed. Fig. 4, is a detail section illustrating a modification of the housing of the bearing rollers. Fig. 5, is a detail section illustrating a slight modification of the intermediate and bearing rollers. Fig. 6, is a detail section illustrating another modification. Fig. 7, is an enlarged detail section of a portion of the construction shown in Fig. 1. Fig. 8, is a view of a modification, and Fig. 9 is a transverse section of the bearing with certain parts omitted.

Referring by letter to the said drawings and more particularly to Figs. 1, 2, 3, and 7, thereof:—A, indicates the shell or casing of my improved bearing; B, indicates the shaft or journal; C, indicates the bearing rollers; D, indicates the housing thereof; and E, indicates the beveled band for crowding the housing upon the bearing rollers.

The housing D, which may be made in one section, as shown in Fig. 1, or in two sections $a, a$, as shown in Fig. 4, is preferably split longitudinally as shown in Fig. 9, so as to permit it to be sprung upon the rollers, and it serves to hold the rib F, which is also split and is designed and adapted to engage the peripheral grooves $b$, of the rollers C, so as to hold said rollers against longitudinal play.

G, G', indicate, respectively, the inner and outer threaded rings for holding the housing D, in position. The ring G', as better shown in Fig. 1, of the drawings is designed in addition to holding the housing, to afford bearings for the screws $G^3$, which are employed to adjust the beveled and split band E, so as to crowd the housing upon the bearing rollers. Thus it will be seen that the bearing rollers may be independently adjusted with respect to the shaft, which is desirable. In addition to the rings G, G', a screw H, may be employed for folding the housing in position. This screw takes through the shell A, and the band E, and into the housing, a slot being formed in the band E, as shown, so that the screw will not interfere with the adjustment thereof.

I, I', indicate the heads of the shell A. The inner head I, is preferably connected to the shell by threads as shown, but the outer head I', is preferably connected by bolts $d$, which take into the shell as illustrated. This head I', is provided with a circular flange $e$, and it has its outer side within said flange, beveled as shown, and provided with a circular groove $f$, which is designed and adapted to receive the rib $g$, of the approximately cone shaped roller J. This roller J, is arranged between the head I', and the beveled collar K, fixed upon the shaft or journal, and it is designed and adapted to prevent friction between said head and collar.

Formed integral with or suitably connected to the ends of the bearing rollers C, are reduced spools $h$, and at the outer ends of said spools $h$, are the further reduced ends or spools $h^2$, which are provided with a circumferential groove $h^3$, and are designed to be surrounded and engaged by the inwardly directed flanges $q$, of the rings L, which flanges $q$, preferably have their inner edges beveled to engage the beveled bottoms of the grooves $h^3$, as shown. The rings L, are also provided with the inner horizontal, inwardly-directed flanges $k$, which have their edges beveled as shown and also have threads upon their inner sides for the engagement of the keeper and adjusting rings M, presently to be described.

N, indicates the intermediate or separating rollers of my improved bearing which are designed and adapted to engage the spools $h$, of the bearing rollers C, and hold said rollers in their proper position. These rollers N, have their peripheral edges beveled as indicated at $l$, for the engagement of the beveled surfaces or edges of the rings L, and M, and they are retained in position by the adjustable rings M', and $M^2$, as shown. The rings M', are provided with an inwardly-directed, radially disposed flange having its edge beveled to engage the peripheral edges of the intermediate rollers, and the said rings are also provided on their inner sides with threads for the engagement of the exterior threads of the rings $M^2$, which are also provided with a beveled surface to engage the intermediate rollers as illustrated. Thus it will be seen that when the rings $M^2$, are screwed into the rings M', or toward the middle of the bearing, the beveled surfaces of said rings M', $M^2$, engaging the beveled edges of the rollers N, will adjust the said rollers to a position between the spools $h$, of the main or bearing rollers, so that all of the parts will revolve freely and without noise. The rings M, which rest within the circular series of intermediate rollers N, as before described, serve in conjunction with the rings L, to hold said rollers in their proper position and prevent them from taking between the bearing rollers and dragging upon the shaft or journal.

If it is found desirable, rings of packing $w'$, may be arranged between the intermediate rollers and the rings M', $M^2$, and also, packing rings, $m^2$, $m^3$, may be arranged between the rings M', $M^2$; the purpose of such packing rings being to prevent rattling and noise.

By reason of the rollers N being adjustable as described, it will be seen that any wear of the shaft B, or rollers may be readily taken up which is an important advantage.

It will be noted from the foregoing description and the drawings that on account of the proportional sizes of all of the parts of my improved bearing, there is absolutely no sliding friction and consequently no appreciable wear.

In Fig. 5, of the drawings, I have illustrated a modified construction of bearing roller, intermediate roller and rings for holding the bearing and intermediate rollers in position. In this construction, the roller C', is simply provided with a spool as $h$, and the ring L', is provided at its inner edge with a flange $q'$, which forms a bearing for the outer end of the spool, and at its outer edge with a flange $q^2$, which is threaded as shown for the engagement of the adjustable ring $M^4$, which serves in conjunction with the inner rings $M^7$, and $M^8$, to retain and adjust the intermediate rollers N'. In this modified construction, the intermediate rollers N', are also provided with trunnions $k'$, which engage the enlarged portions of the spool $h$. The inner ring $M^7$, of the said construction is preferably of an angular form in cross-section, as shown, and it has its vertical member beveled, as shown to engage the beveled roller N', while its horizontal member is threaded for the engagement of the ring $M^8$, which is also beveled and is designed to engage the opposite side of the roller N'. The said rings $M^7$, $M^8$, in addition to adjusting the intermediate rollers, also serve to hold a packing ring $M^9$, against the said rollers so as to prevent rattling, &c.

In Fig. 6, I have shown a construction which is similar to that shown in Fig. 5, with the exception of the ring $L^2$, which has its inner flange $q^3$, extended so as to rest within the circular series of intermediate rollers, and provided with a groove $j'$, so that it will not be engaged by said rollers.

In some cases instead of employing independent separating rollers as N, at opposite ends of the box, I may employ rollers as $N^7$, which are designed to rest between the reduced spools $h$, of the bearing rollers at opposite ends of the box and are connected by a reduced shaft $P^7$, (see Fig. 8,) which reduced shaft is designed to extend longitudinally of the box and be arranged alternately with respect to the bearing rollers C, so as to turn between the said rollers. The shaft $P^7$, is fixedly connected to the rollers $N^7$, and consequently it will be perceived that the said rollers will turn in unison. This latter construction is better applicable to the form of intermediate roller shown in Fig. 5, but it may also be employed in conjunction with the intermediate rollers which have no trunnions, if desirable.

It will be noted from the foregoing description, taken in connection with the drawings, that my improved bearing is very simple and durable, that it may be applied with equal facility to a shaft or to a car axle; that it may be readily adjusted for the purposes before stated, and that it embodies no parts that are liable to get out of order, all of which are important advantages.

In the constructions, shown in Figs. 5, and 6, the inner flanges of the rings L', $L^2$, and the ends of the spools $h$, are of such proportional sizes that the spools will traverse said flanges in four revolutions. The rollers N', are also of such a size that they will be caused to revolve five times in a circuit, and inasmuch as the said rollers traverse the rings in five revolutions, it will be perceived that there is absolutely no sliding or abrasive friction between the parts, and consequently no wear.

I have endeavored in the foregoing description to fully and clearly disclose my invention so that the same may be readily appreciated and practiced, but I do not wish to be understood as confining myself to the specific construction and arrangement of parts set forth, as such changes or modifications may be made in practice as fairly fall within the scope of my invention.

Having described my invention, what I claim is—

1. In an anti-friction roller bearing, the combination of a series of bearing rollers, a series of intermediate or separating rollers, a ring surrounding and engaging and affording a bearing for the bearing rollers, and an adjustable ring engaging the intermediate rollers; the said adjustable ring being adapted to adjust the intermediate rollers with respect to the bearing rollers, and a shaft or journal, substantially as specified.

2. In an anti-friction roller bearing, the combination of a series of bearing rollers, a series of intermediate or separating rollers having a beveled edge, a ring engaging the bearing rollers, and an adjustable ring surrounding the intermediate rollers and having a bevel surface in engagement with said beveled edge of the intermediate rollers; said adjustable rings being adapted to adjust the intermediate rollers, substantially as and for the purpose set forth.

3. In an anti-friction roller bearing, the combination of a series of bearing rollers, a series of intermediate or separating rollers, a ring engaging the bearing rollers and having a series of screw threads, and an adjustable ring surrounding and engaging the intermediate rollers and having screw threads to engage the threads of the ring of the bearing rollers, and the said adjustable ring being adapted to adjust the intermediate rollers with respect to the bearing rollers, substantially as and for the purpose set forth.

4. In a roller bearing the combination with a shell or casing, a journal, and a series of bearing rollers surrounding and engaging the journal, of a split housing surrounding the bearing rollers, a beveled and split band interposed between the housing and shell or casing, and a suitable means for adjusting the said band, substantially as specified.

5. In a roller bearing, the combination with a shell or casing, a journal, and bearing rollers surrounding and engaging the journal, of a split housing surrounding the bearing rollers, a split and beveled band interposed between the housing and the shell or casing, a ring having threads to engage threads in the shell or casing and adapted to retain the housing, and screws taking through said ring and engaging the beveled and split band, substantially as specified.

6. In an anti-friction roller bearing, the combination of a shaft or journal, a series of bearing rollers, a suitable means for holding said rollers to the shaft, a series of intermediate or separating rollers arranged alternately with respect to the bearing rollers, and having a beveled edge, and an adjustable ring surrounding the intermediate rollers and having a beveled surface for engaging the beveled edge of the intermediate rollers; the said ring being adapted to adjust the intermediate rollers with respect to the bearing rollers, substantially as specified.

7. In an anti-friction roller bearing, the combination of a series of bearing rollers, a series of intermediate or separating rollers, a ring surrounding and engaging the bearing rollers, an adjustable ring engaging the intermediate rollers; the said adjustable ring being adapted to adjust the intermediate rollers with respect to the bearing rollers, and a packing interposed between the adjustable ring and the peripheries of the intermediate rollers, substantially as specified.

8. In an anti-friction roller bearing the combination, with a series of bearing rollers having the reduced spools or portions $h$ and the reduced ends or spools $h^2$, a series of intermediate or separating rollers arranged between the bearing rollers and engaging the spools or portions $h$, thereof, rings L, engaging the intermediate rollers, the reduced ends or spools $h^2$, of the bearing rollers, and a suitable means for retaining the intermediate rollers in engagement with the rings L, M, and the rings M, adjustably connected to the rings L, and engaging the intermediate rollers, substantially as specified.

9. In an anti-friction roller bearing, the combination with a series of bearing rollers having the reduced spools or portions $h$, and the reduced ends or spools $h^2$, and a series of intermediate or separating rollers arranged between the bearing rollers and engaging the spools or portions $h$, thereof; of the rings L, engaging the intermediate rollers and the reduced ends or spools $h^2$, of the bearing rollers, the rings M, adjustably connected to the rings L, and resting within and engaging the series of intermediate rollers, and the adjustably connected rings M' M², surrounding and engaging the intermediate rollers, all substantially as specified.

10. In an anti-friction roller bearing, the combination of a series of bearing rollers, a series of intermediate or separating rollers, a ring engaging and affording a bearing for the bearing rollers, an adjustable ring M, arranged within the circular series of intermediate rollers and engaging said rollers, and adjustable rings M', M², surrounding the circular series of intermediate or separating rollers and engaging said rollers, substantially as specified.

In testimony whereof I affix my signature in presence of two witnesses.

JAMES D. MATTISON.

Witnesses:
ISAAC L. TURNER,
MORRIS HOFFMAN.